(12) United States Patent
Thal

(10) Patent No.: US 7,318,296 B2
(45) Date of Patent: Jan. 15, 2008

(54) DEEP SEA FISHING LURE TRAY

(76) Inventor: James W. Thal, 71 Stonehenge Dr., Lincroft, NJ (US) 07738

(*) Notice: Subject to any disclaimer, the term of this patent is extended or adjusted under 35 U.S.C. 154(b) by 141 days.

(21) Appl. No.: 10/870,757

(22) Filed: Aug. 27, 2004

(65) Prior Publication Data
US 2005/0262755 A1 Dec. 1, 2005

Related U.S. Application Data

(63) Continuation-in-part of application No. 10/273,636, filed on Oct. 21, 2002, now abandoned.

(51) Int. Cl.
*A01K 97/06* (2006.01)
(52) U.S. Cl. .................................... 43/57.2
(58) Field of Classification Search ............. 43/57.2, 43/44.2, 44.98
See application file for complete search history.

(56) References Cited

U.S. PATENT DOCUMENTS

| | | | | |
|---|---|---|---|---|
| 595,998 A | * | 12/1897 | Garland | 43/57.2 |
| 885,511 A | * | 4/1908 | Newsome | 43/57.2 |
| 1,570,213 A | * | 1/1926 | Focht | 43/57.2 |
| 1,737,376 A | * | 11/1929 | Knettles | 43/57.2 |
| 2,080,794 A | * | 5/1937 | Squassoni | 43/57.2 |
| 2,102,682 A | * | 12/1937 | De Witt et al. | 43/57.2 |
| 2,144,300 A | * | 1/1939 | Stryker, Jr. | 43/57.2 |
| 2,638,699 A | * | 5/1953 | Seeburg | 43/57.2 |
| 2,730,833 A | * | 1/1956 | Newell | 43/57.2 |
| 2,749,654 A | * | 6/1956 | Harris | 43/57.2 |
| 2,826,856 A | * | 3/1958 | Marion et al. | 43/57.2 |
| 2,866,295 A | * | 12/1958 | Shanks | 43/57.2 |
| 2,879,619 A | * | 3/1959 | Peterson | 43/57.2 |
| 3,490,168 A | * | 1/1970 | Posavec | 43/57.2 |
| 3,564,755 A | * | 2/1971 | Lindgren | 43/57.2 |
| 4,631,856 A | * | 12/1986 | Born | 43/57.1 |
| 4,924,621 A | * | 5/1990 | Hawranik et al. | 43/57.2 |
| 5,386,662 A | * | 2/1995 | Vader et al. | 43/57.2 |
| 5,941,017 A | * | 8/1999 | Junck et al. | 43/57.2 |
| 2004/0074137 A1 | * | 4/2004 | Levy | 43/57.2 |

* cited by examiner

*Primary Examiner*—Kurt Rowan
(74) *Attorney, Agent, or Firm*—Charles I. Brodsky

(57) ABSTRACT

A tray of such dimensioning to receive a deep sea fishing lure, with side surfaces including a plurality of spaced-apart nibs to receive the length of its included leader in securing the lure in a tight, compact arrangement+.

18 Claims, 3 Drawing Sheets

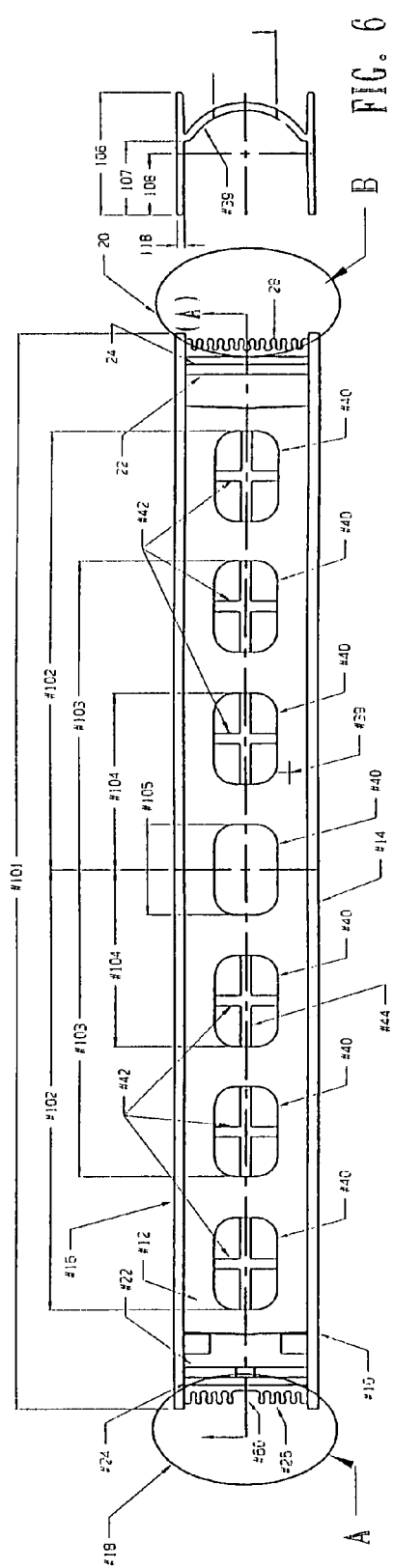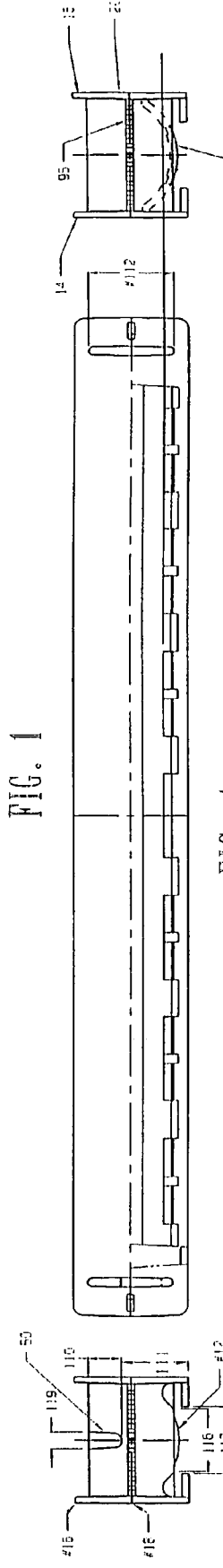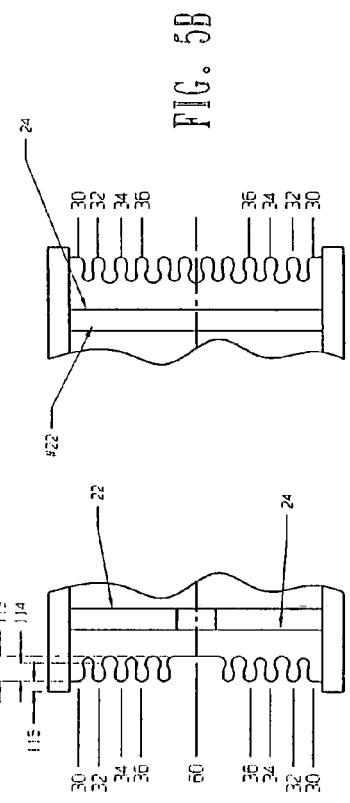

DEEP SEA FISHING LURE TRAY

CROSS-REFERENCE TO RELATED APPLICATIONS

This Application is a Continuation-in-Part of application Ser. No. 10/273,636, filed Oct. 21, 2002 now abandoned.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to apparatus employed in fishing, in general, and to a tray for securing deep sea fishing lures, in particular.

2. Description of the Related Art

Tackle boxes used in the fishing of rivers, lakes, streams and ponds are well known. As will be appreciated and understood, however, such tackle boxes are generally of insufficient size to secure the larger lures used for fishing tuna, marlin, swordfish, etc. as found in deep sea ocean waters. Not only does the lure itself not usually fit within the individual compartments of the tackle box, but the 10-15 feet or so of leader employed is unable to be fitted in and secured either. As is known, the common way of then dealing with these deep sea lures is to wrap the leader haphazardly about the lure, and stick the lure within a large plastic bag. Not only is this a messy and generally undesirable method of storage, but the sealing of the plastic bag locks the salt water residue inside, preventing it from evaporating—thereby leading to a rusting and ultimate deterioration of the lure. While some week-end fisherman might consider that arrangement acceptable, to the "professional" and/or commercial fisherman, such approach is not good enough—especially when fishing a "hot" area where quick and easy access to the lure and its leader is of utmost importance.

OBJECTS OF THE INVENTION

It is an object of the present invention, therefore, to provide a new and improved manner of storing deep sea fishing lures in a tackle box.

It is an object of the invention, also, to provide a tray on which the deep sea lure and its leader can be compactly arranged for securement when not needed.

It is another of the invention to provide such a tray configuration which allows for a convenient and quick removal of the deep sea lure for attachment to the fishing line to be used.

It is a further object of the invention to provide a tray of this type which can be stored within a tackle box compartment along with the deep sea fishing lure secured when not being used, but which can be removed therefrom and carried about separately, on a fishing expedition.

SUMMARY OF THE INVENTION

As will become clear from the following description, the tray of the invention has a bottom section, front and rear sections coupled with it, and first and second side sections coupled between the front and rear sections. In accordance with the invention, each side section includes an inwardly facing surface and an outwardly facing surface having a plurality of outwardly extending spaced-apart nibs. With the tray being fabricated of a plastic composition, for example—and of an injection molded plastic composition in particular—, a deep sea fishing lure is placed to rest on the bottom section, between the front and rear sections, and between the first and second side sections. Such fishing lure will be understood to include a length of leader of diameter equal to or less than the spacing between individual ones of the spaced-apart nibs, and is of considerable length.

As will also become clear, each of the plurality of nibs is spaced-apart one from another in a common plane, with the bottom section of the tray being of an upwardly extending curvilinear cross-section to receive the lure. Individual ones of a pair of outwardly extending nibs, on the one hand, are spaced unequally apart from individual ones of an adjacent pair of nibs—whereas, on the other hand, individual ones of a different pair of outwardly extending nibs are spaced equally apart from individual ones of a different adjacent pair of nibs. As will be appreciated by those skilled in the art, this allows for the winding of the leader over the side sections of the tray, and for leaders of different diameter, as is oftentimes the case. With the front and rear sections of the tray, and its first and second side sections being coupled at substantially right angles to one another, the tray of the invention preferably incorporates at least one of the side sections so as to comfortably accept the ends of the lure in secure position—optimally with both of the side sections being so coupled. In this respect, the bottom section of the tray may include a plurality of spaced-apart apertures as well, to allow for dispersal of any ocean water which may adhere to the lure when placed within the tray.

To further aid in the winding of the leader about the tray, and to be held in place between the outwardly extending spaced-apart nibs, various notches may further be fabricated within the tray—for example, in either or both of the side sections extending from a top edge thereof, and/or within the common plane of either or both side sections between the alignment of the spaced-apart nibs.

As will be appreciated by those skilled in the art, with the tray of the invention, its selected dimensioning enables the deep sea fishing lure to be received—and then held in a tight, compact arrangement by winding the long length of its leader through, around, and about the spaced-apart nibs over and over again, and between adjacent nibs as frequently as dictated by the length, which then hold it in place until needed. As will be appreciated, the winding and unwinding of the leader becomes a simple, quick process, of a type needed when fishing in "hot" areas of the sea, releasing a lure for connection to the line, or storing it away, as the need arises.

BRIEF DESCRIPTION OF THE DRAWINGS

These and other features of the present invention will be more clearly understood from a consideration of the following description, taken in connection with the accompanying drawings, in which:

FIG. 1 is a top view of a preferred embodiment of a deep sea fishing lure tray constructed in accordance with the invention;

FIGS. 2 and 3 are side views helpful in an understanding of the construction of the fishing lure tray;

FIGS. 4 and 6 are sectional views also helpful in an understanding of the fishing lure tray construction;

FIGS. 5A and 5B are top views helpful in an understanding of the spaced-apart nib arrangements for receiving and holding the fishing lure leader.

DETAILED DESCRIPTION OF THE INVENTION

Figure 7:
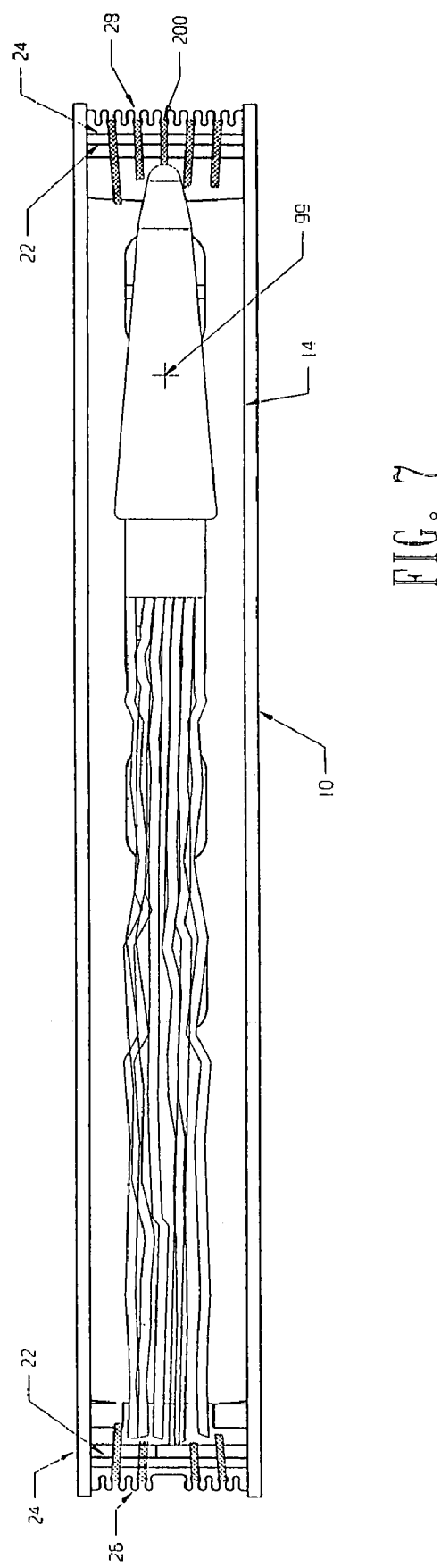
FIGS. 7 and 8 illustrate a deep sea fishing lure in place within the tray of the invention.

In the drawings, the deep sea fishing lure tray 10 includes a bottom section 12, front and rear sections 14, 16 coupled therewith and a pair of side sections 18, 20 coupled between the front and rear sections 14, 16. As more particularly shown in FIG. 1, each side section includes an inwardly facing surface 22, and an outwardly facing surface 24 having a plurality of outwardly extending spaced-apart nibs—shown at 26 with respect to the side section 18 and at 28 with respect to the side section 20. As shown in FIG. 1—and more particularly shown in FIGS. 5A and 5B as Details of the sections A and B, respectively—individual ones of a pair of outwardly extending nibs as 30, 32 are spaced unequally apart from individual ones of the adjacent pair of outwardly extending nibs 34, 36. This can be accomplished, for example, by having the spacing between the nibs 30, 32 of a 0.034 inch radius, and the spacing between the nibs 32 and 34 as being of a 0.045 inch radius. Such unequal spacing will be appreciated to allow for different diameter leaders being held in place when wound over the side sections 18, 20 within the spacings so formed by the different radii, although in alternative embodiments, the spacing between all individual nibs could be set equally between adjacent nibs. As FIGS. 2 and 3 illustrate, the nibs 26 and 28 are spaced apart one from another in a common plane, shown as 95. FIGS. 2 and 3 also illustrate the bottom section 12 of the tray 10 as being of an upwardly extending curvilinear cross-section. This allows the lure to rest in secured position between the front and rear sections 14, 16, and between the side sections 18, 20, supported by the bottom section 12.

Figure 8:
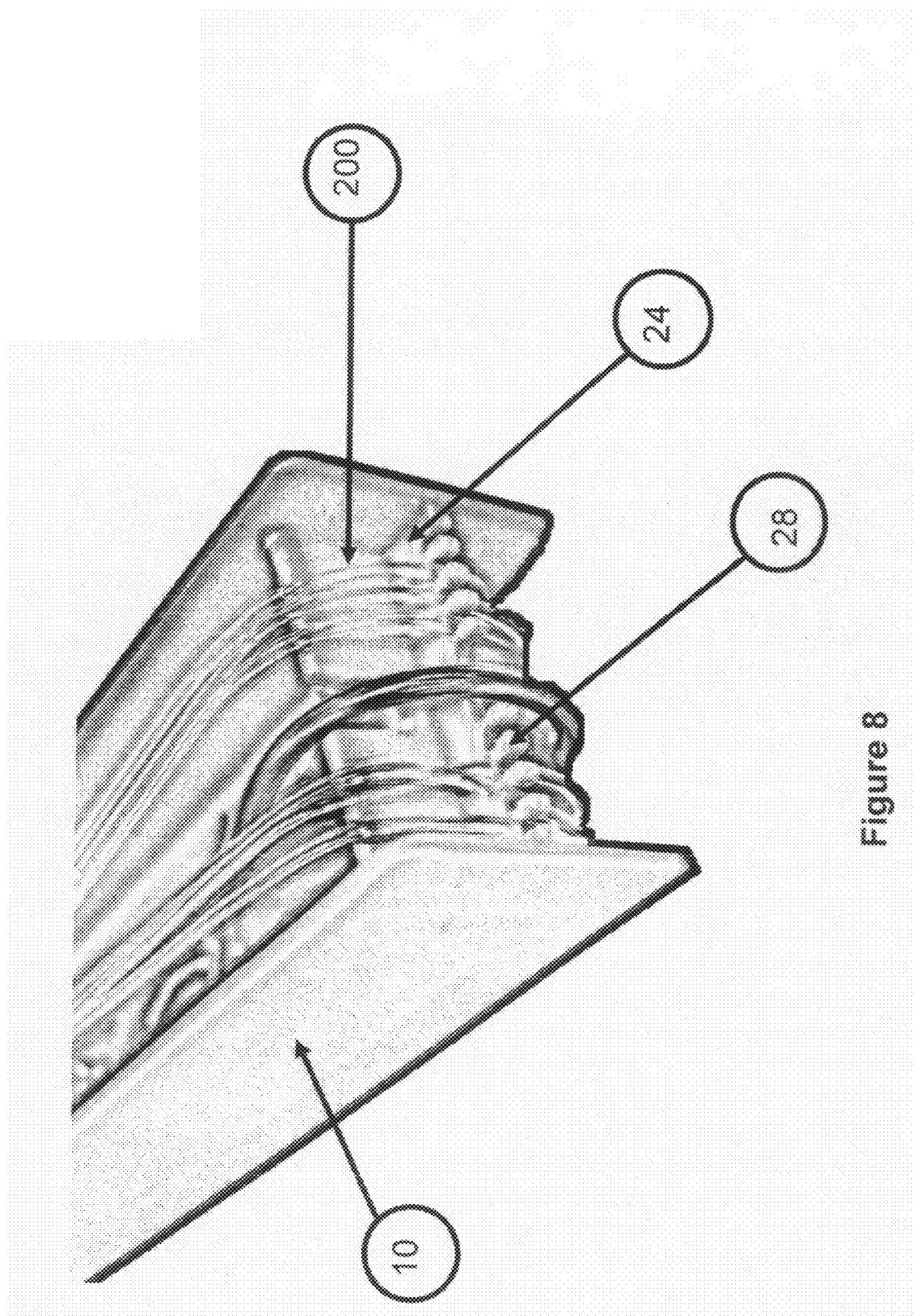

As FIGS. 1 and 4 illustrate, at least one of the side sections 18, 20—and preferably both side sections—is coupled between the front and rear sections 14, 16 at locations farther along a length of the front and rear sections 14, 16 than is the bottom section 12. Such sizing enhances the ability of a lure placed on the bottom section 12 to be supported substantially flat, with its opposing ends fitting within the opening 39 which results. By having the front and rear sections 14, 16, and the first and second side sections 18, 20 coupled with one another at substantially right angles, the deep sea fishing lure 99 can be held securely in place within the tray so formed (FIG. 7), its leader being shown at 200 (FIG. 8).

The bottom section 12 in this respect includes a plurality of spaced-apart apertures 40 to help drain any sea water which may be on the lure when it is placed in the tray 10, so as to lessen the possibility of the hooks rusting by the oxidizing action of the salt water adhering to the lure itself. Such apertures 40 also assist in rinsing off the lure from a sink on the boat, or elsewhere, in flushing off any salt accumulations. With the various sections of the tray 10 being fabricated of a plastic composition—and particularly of an injection molded plastic composition—the middle aperture 40A in the bottom section 18 will be understood to be that where the plastic enters the core in the fabrication process. The arms 42, 44 within the spaced-apart apertures 40 not only assist in easing the plastic flow during the injection molding process, but also serve in containing the skirt of the lure in a more secure position.

To further enable the length of leader to be wound about the tray to be held in position by the nibs 30, 32, 34 and 36 quickly and easily, at least one of the side sections 18, 20 includes a first notch 50 which downwardly extends from a top edge 52 of the side section—as in FIG. 2. To enhance the ease and speed of winding, at least one of the side sections 18, 20 include their pluralities of spaced-apart nibs 30, 32, 34, 36 separated by a second notch 60 within its common plane, as in FIGS. 1 and 5A. With 10-15 feet of leader length being common, the winding could then proceed first through the notch 50, then through the notch 60 before being taken through the spaced-apart nibs on the right side of the tray 10, for example, before being brought around the tray lengthwise to be fitted through the spacing of the nibs on the left side. With the notches 50 and 60 replicated in the side section 20 as well, the ease of winding and securing the leader length could be enhanced still further. As will be apparent, the spacing between individual ones of the spaced-apart nibs is selected of a dimension to receive the diameter of the leader length being wound. FIG. 6, in this respect, illustrates a side view of the tray of FIG. 1, with the side section 28 being removed as reflective of the curvature of the bottom section 12.

As will also be appreciated, how many times the leader is wound around the tray and through the spaced-apart nibs, and whether between adjacent nibs over and over again, depends upon the exact length of the leader being confronted. In operation, the length of the leader is wound around the tray and between adjacent nibs of each side section where they are snapped in place—first, between one pair of adjacent nibs on a first side section, and then sequentially around the tray, between one pair of adjacent nibs on a second side section; then, the leader is wound around the cradled lure, between a different pair of adjacent nibs on the first side section, around the tray a second time, and then between a different pair of adjacent nibs on the second side section, with the leader being each time snapped in place between each pair of nibs on each side of the tray. If the length of the leader is still not taken up, the leader is then wound around the cradled lure again, to continue sequentially being wound between different pairs of adjacent nibs on each of the first and second side sections, the lure, and the tray, until the length of leader is fully wound and snapped in place between the adjacent pairs of nibs.

While the dimensions selected for the deep sea fishing lure tray of the invention will depend upon the dimensions for the lure being secured, the following have proved useful in one construction of the invention:

| | |
|---|---|
| Dimension 101 | 13.250 inch |
| Dimension 102 | 5.438 inch |
| Dimension 103 | 3.813 inch |
| Dimension 104 | 2.188 inch |
| Dimension 105 | 1.125 inch |
| Dimension 106 | 1.500 inch |
| Dimension 107 | 0.906 inch |
| Dimension 108 | 0.750 inch |
| Dimension 109 | 0.750 inch |
| Dimension 110 | 0.437 inch |
| Dimension 111 | 0.094 inch |

-continued

| | |
|---|---|
| Dimension 112 | 1.125 inch |
| Dimension 113 | 0.153 inch |
| Dimension 114 | 0.108 inch |
| Dimension 115 | 0.063 inch |
| Dimension 116 | 0.823 inch |
| Dimension 117 | 0.875 inch |
| Dimension 118 | 0.089 inch |
| Dimension 119 | 0.224 inch |

As will be apparent, a single deep sea fishing lure rests on the bottom section of the tray in using the inventive concept, between its front and rear sections, and between its first and second side sections. FIG. 7 illustrates the deep sea fishing lure thus secured in a tray with this repeated winding of the leader as many times as is necessary to thus be secured. As such, the tray is effective in cradling the deep sea fishing lure with its leader for placement as a completed unit in a compartment of a deep sea tackle box. And, at the same time, the tray, together with its deep sea lure and its 10-15 feet or so of leader now completely wound up and snapped securely in place, can also be removed from the tackle box and carried about separately, without the need for taking the tackle box along.

While there have been described what are considered to be preferred embodiments of the present invention, it will be readily appreciated by those skilled in the art that modifications can be made without departing from the scope of the teachings herein of a tray for securing deep sea fishing lures of a type which can be secured within a tackle box when not being used, but which can be removed to be carried out on a separate fishing expedition if needed. Whereas different spacings for the nibs can be selected, and different notch combinations employed in the side sections 18, 20, the end result will continue to be one in which the deep sea lure can be compactly arranged for securement when not needed. Essentially, the deep sea fishing lure is cradled on the bottom section of the described tray, with the length of its attached leader being wound between different pairs of adjacent nibs extending from each side section of the tray—i.e., on one side of the tray, the leader winds between one pair of nibs, while in a second winding, the leader is snapped in place between a different pair of nibs, and in a third winding, between yet another pair of nibs. Recognizing that this continues on the other side of the tray as well (where every winding of the leader is snapped in place on both sides between different pairs of nibs), the resulting arrangement is able to secure as a compact unit those deep sea fishing lures which typically come with 10-15 feet or so of leader. For at least such reason, therefore, resort should be had to the claims appended hereto for a true understanding of the scope of the invention.

I claim:

1. A deep sea fishing lure tray for a deep sea tackle box consisting of:
   a tray having spaced apart front and rear sections, spaced apart first and second side sections coupled between inside facing surfaces of said front and rear sections, and a bottom section coupled between said inside facing surfaces of said front and rear sections of dimension to cradle a single deep sea fishing lure and its leader resting thereupon within the spacings between said front and rear sections and between said first and second side sections for placement as a completed unit in a compartment of said deep sea tackle box;
   wherein each side section includes an inwardly facing surface and an outwardly facing surface having a plurality of outwardly extending nibs, individual pairs of which are separated a distance to retain the diameter of the length of leader coupled with the single deep sea fishing lure on said bottom section when the length of leader is wound around the tray and between adjacent nibs of each side section to be snapped in place thereby, first between one pair of adjacent nibs on said first side section, then sequentially around the tray, between one pair of adjacent nibs on said second side section, around the cradled lure, between a different pair of adjacent nibs on said first side section, around said tray second time, between a different pair of adjacent nibs on said second side section, around said cradled lure a second time, and continuing sequentially between different pairs of adjacent nibs on each of said first and second side sections, said lure and said tray until the length of leader is fully wound and snapped in place between the adjacent pairs of nibs;
   wherein each of said plurality of nibs is spaced apart one from another in a common plane; and
   wherein said bottom section of said tray is of an upwardly extending curvilinear cross-section cradling the single fishing lure received thereon.

2. The deep sea fishing lure tray of claim 1 wherein individual ones of a pair of outwardly extending nibs are spaced unequally apart from individual ones of an adjacent pair of said nibs.

3. The deep sea fishing lure tray of claim 1 wherein individual ones of a pair of outwardly extending nibs are spaced equally apart from individual ones of an adjacent pair of said nibs.

4. The deep sea fishing lure tray of claim 1 wherein at least one of said side sections is coupled between said front and rear sections at locations farther along a length of said front and rear sections than is said bottom section.

5. The deep sea fishing lure tray of claim 1 wherein both of said side sections are coupled between said front and rear sections at locations farther along a length of said front and rear sections than is said bottom section.

6. The deep sea fishing lure tray of claim 1 wherein said front and rear sections, and said first and second side sections are coupled at substantially right angles to one another.

7. The deep sea fishing lure tray of claim 6 wherein at least one of said side sections includes a first notch downwardly extending from a top edge thereof.

8. The deep sea fishing lure tray of claim 7 wherein at least one of said side sections includes first and second pluralities of spaced-apart nibs separated by a second notch within said common plane.

9. The deep sea fishing lure tray of claim 1 one side section includes first and second pluralities of spaced-apart nibs separated by a second notch within said common plane.

10. The deep sea fishing lure tray of claim 1 wherein said bottom section includes a plurality of spaced-apart apertures extending entirely through said bottom section.

11. The deep sea fishing lure tray of claim 1 wherein said tray is fabricated of a plastic composition.

12. The deep sea fishing lure tray of claim 1 wherein said tray is fabricated of an injection molded plastic composition.

13. Apparatus for a deep sea tackle box consisting of:
   a tray having a bottom section, front and rear sections coupled therewith, and first and second side sections inwardly coupled between said front and rear sections; and a single deep sea fishing lure resting on said bottom section, and between said front and rear sections and between said first and second side sections;

wherein each side section includes an inwardly facing surface and an outwardly facing surface having a plurality of outwardly extending spaced-apart nibs;

wherein said fishing lure includes a length of leader of diameter equal to or less than the spacing between individual ones of said spaced-apart nibs;

wherein said bottom section of said tray is of an upwardly extending curvilinear cross-section to cradle said lure and pass said length of leader through said spacing between said nibs;

wherein said tray is of a dimension for placement within a compartment of said deep sea tackle box;

wherein individual pairs of said nibs are separated a distance to retain said length of leader when wound around the tray and between adjacent nibs of each side section to be snapped in place thereby, first between one pair of adjacent nibs on said first side section, then sequentially around the tray, between one pair of adjacent nibs on said second side section, around the cradled lure, between a different pair of adjacent nibs on said first side section, around said tray a second time, between a different pair of adjacent nibs on said second side section, around said cradled lure a second time, and continuing sequentially between different pairs of adjacent nibs on each of said first and second side sections, said lure and said tray until the length of leader is fully wound and snapped in place between the adjacent pairs of nibs; and wherein said tray is fabricated of a plastic composition.

14. The apparatus of claim 13 wherein said front and rear sections of said tray, and said first and second side sections of said tray, are coupled at right angles to one another.

15. The apparatus of claim 13 wherein at least one of said side sections of said tray includes a first notch downwardly extending from a top edge thereof, and wherein said one side section includes first and second pluralities of spaced-apart nibs separated by a second notch in a plane common to all of said nibs.

16. The apparatus of claim 13 wherein at least one of said side sections of said tray is coupled between said front and rear sections of said tray at locations farther along a length of said front and rear sections then is said bottom section of said tray.

17. The apparatus of claim 13 wherein both of said side sections of said tray are coupled between said front and rear sections of said tray at locations farther along a length of said front and rear sections then is said bottom section of said tray.

18. The apparatus of claim 13 wherein said bottom section of said tray includes a plurality of spaced-apart apertures extending entirely through said bottom section.

* * * * *